May 3, 1932. J. N. WALTON 1,856,086
PROCESS AND APPARATUS FOR MANUFACTURING PACKING
Filed June 29, 1929 2 Sheets-Sheet 1
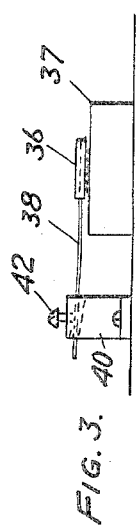
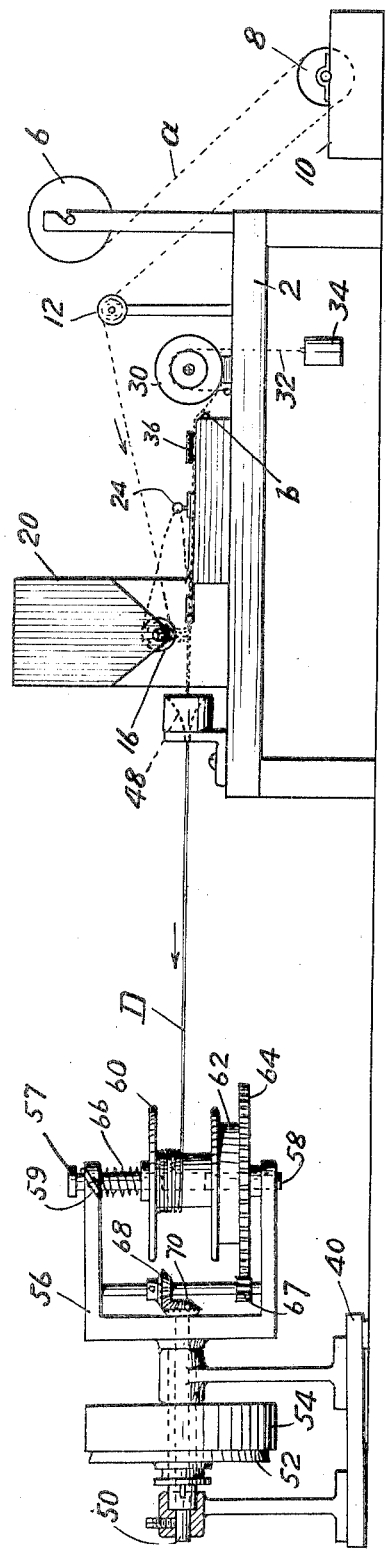
INVENTOR
Julian N. Walton
BY
Busser & Harding
ATTORNEYS.
WITNESS:
Robt R Kitchel.

May 3, 1932. J. N. WALTON 1,856,086
PROCESS AND APPARATUS FOR MANUFACTURING PACKING
Filed June 29, 1929 2 Sheets-Sheet 2
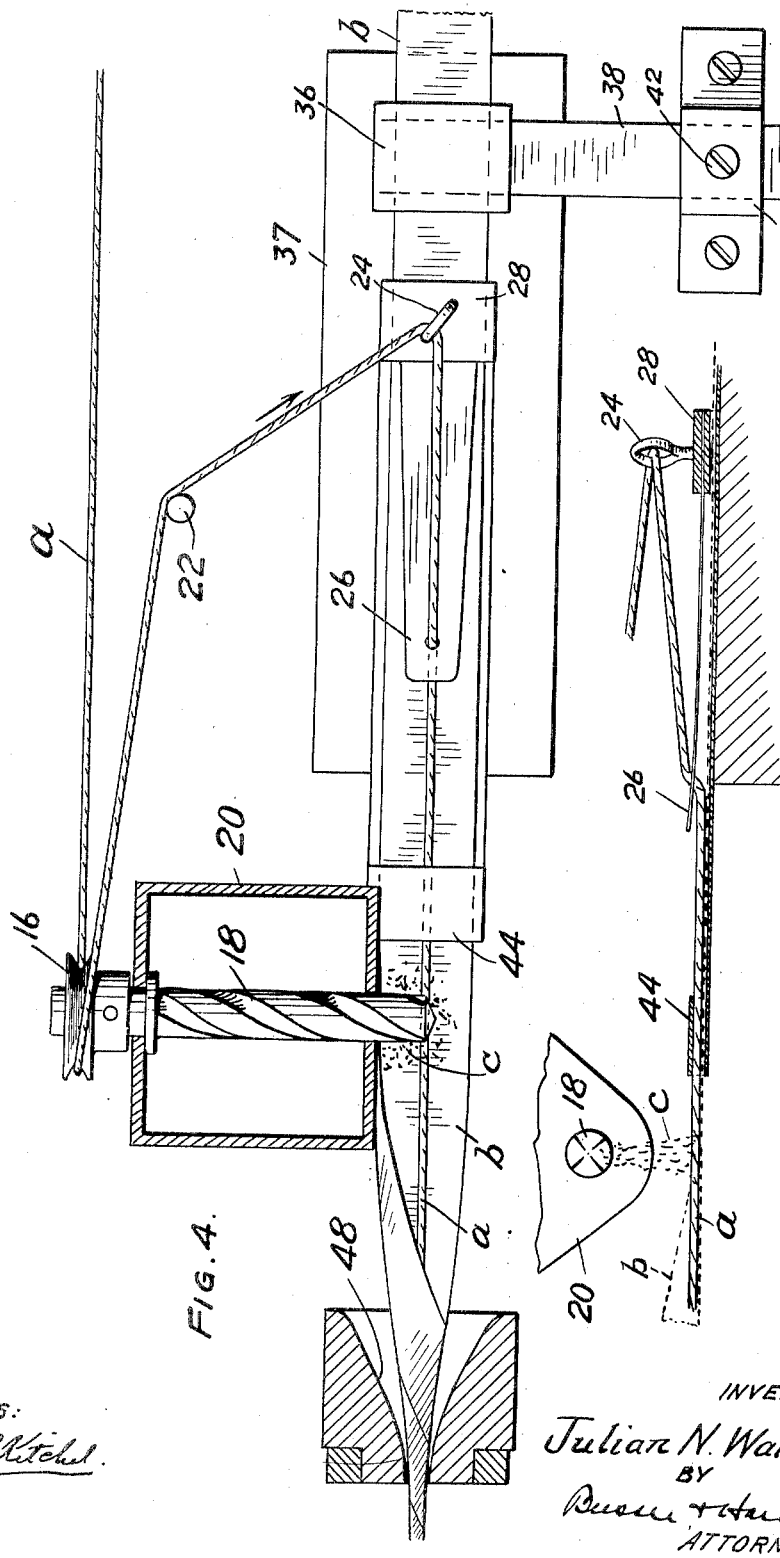

Patented May 3, 1932

1,856,086

UNITED STATES PATENT OFFICE

JULIAN N. WALTON, OF BROOKLYN, NEW YORK, ASSIGNOR TO THE ANCHOR PACKING COMPANY, OF PHILADELPHIA, PENNSYLVANIA, A CORPORATION OF NEW JERSEY

PROCESS AND APPARATUS FOR MANUFACTURING PACKING

Application filed June 29, 1929. Serial No. 374,926.

This invention relates to a process for manufacturing packing for journal boxes or the like and mechanism for conveniently carrying out the novel process.

An advantageous form of packing for journal boxes or similar machine parts is found to consist of a composite material composed of a suitable cord about which is twisted metallic foil and which preferably includes in its construction granules of graphite or other suitable lubricating material.

It is the primary object of the present invention to produce a composite strand which may be built up into suitable packing members in the form of annular rings or other shapes dependent upon the uses to which the packing is put. The process is primarily designed to produce a composite strand of this character which is most readily adapted for manipulation to produce such packing in that it is readily worked so as to be braided or wound into final shape.

Further objects of the invention relate to the provision of a mechanism whereby the process may be most advantageously carried out in an automatic fashion so as to produce not only a suitable composite strand but also to wind up such strand in a proper fashion to produce a spool of the composite material.
In the drawings:

Fig. 1 is a side elevation of a preferred form of mechanism adapted to carry out the improved process;

Fig. 2 is a plan view showing the type of composite strand produced by the mechanism;

Fig. 3 is a detail view showing a tensioning means for the metallic foil;

Fig. 4 is an enlarged plan view partly in section showing details of the mechanism; and Fig. 5 is a longitudinal vertical section showing the formation of the composite strip.
The machine consists of two portions, namely, an assembling portion mounted on a suitable supporting table or the like 2 and a winding portion supported upon a suitable frame 4. A spool 6 mounted on frame 2 carries a supply cord $a$ of asbestos or other fibrous material which passes from the spool about a pulley 8 whereby it is submerged within a reservoir 10 carrying either powdered graphite or a liquid or semi-liquid lubricating material. From pulley 8 the cord passes over a guiding post 12 and thence about a pulley 16 mounted on the end of a screw conveyor 18 positioned in the lower end of a bin 20 from which it is adapted to supply flaked graphite or similar lubricating material $c$ in a manner which will be hereinafter described.

From the pulley 16 which the cord $a$ drives in its passage it passes about or through suitable guides 22 and 24 and thence downwardly through an aperture in the end of a flexible plate 26 carried by a guiding member 28 within which is a slot serving to properly align a strip of metallic foil such as aluminum, lead or tin foil passing therethrough. This metallic foil is carried by a supply spool 30 on one end of which is mounted a drum about which is trained a belt or cord 32 secured at one end to the frame and carrying at its other end a weight 34 so as to offer frictional resistance to unwinding of spool 30 and thereby impose a tension upon the strip of metallic foil. From the spool the metallic foil passes beneath a tension plate 36 which serves to brace the same against a base plate 37, said tension plate being carried at the free end of a flat spring 38 which is fulcrumed in a slot in a support 40 so that it may be tensioned downwardly as indicated in Fig 3 by adjustment of a screw 42 which bears upon the spring inwardly of its fulcrum. As the strip of metal foil $b$ passes beneath the eye in the flexible plate 26 the cord $a$ is located thereover and together they pass through a suitable guiding slot formed in a member 44 carried by the frame and thence below the discharge position of screw conveyor 18 where flaked graphite or the like is delivered upon the strip and cord. Following the delivery of the graphite, the strip of metallic foil is twisted about the cord enclosing the graphite, the twisted strip passing through a die provided with a tapering opening 48 serving to compress the composite twisted strip D.

The twisting of the composite strip is effected by mechanism carried by frame 4. In this frame is suitably fixed a shaft 50 on which is journalled a power driven clutch member 52 which is arranged to be driven through the medium of a pulley carried thereby, which member 52 cooperates with a second clutch member 54 carried by a sleeve journalled in the frame concentrically with the fixed shaft 50 and carrying a rotatable supporting frame 56. The rotatable frame 56 is of U-shape, being provided with two arms extending in the direction of the shaft 50. In one of these arms is located a fixed pin 58, while in the other arm there is located an assembly pin 57 adapted to be detachably secured in the frame by means of a thumb screw 59. A flanged spool 60 is provided with a central aperture in which are receivable the inner ends of pins 58 and 57. One flange of spool 60 is arranged to frictionally bear against a collar 62 carried by a pinion 64 rotatably mounted upon pin 58. The spool 60 is pressed against member 62 by means of a spring 66 surrounding the assembly pin 57. It will be clear from the above construction that the spool may be removed by freeing pin 57 and pulling the same outwardly so as to disengage the pin from the aperture in the spool and thereby permit the disengagement of the spool from pin 58. Pinion 64 meshes with a small pinion 67 carried by a transverse shaft journalled in the rotatable frame, which shaft carries a bevel gear 68 meshing with a bevel gear 70 fixedly secured to the fixed shaft 50.

As indicated in Fig. 1, the axis of shaft 50 and the rotatable clutches does not extend in the direction of the opening 48 of the die, but, as indicated in that figure, slopes upwardly in the direction of the assembling mechanism.

The operation of the device will be apparent from the above description. During rotation of the frame 56 upon engagement of clutch members 52 and 54, the spool 60 is rotated about the axis of the fixed shaft 50 so as to twist the metallic foil about the cord and graphite. As this twisting proceeds, the engagement of bevel gear 68 with the fixed bevel gear 70 will cause a rotation of spool 60 about the axis of pins 57 and 58 to take up the twisted composite material. Inasmuch as the spool is merely frictionally driven, the composite twisted material will be taken up only yieldingly so as not to produce any breaking of the same because of undue tension resulting from stoppage in the assembling mechanism or by undue resistance of the die 48. As the material is drawn along, the cord a serves to rotate the screw conveyor 18 at a definite relative velocity with respect to the cord so that an even distribution of graphite in the composite material is obtained.

By the sloping arrangement of the axis of rotation of the frame it is found that the composite material will be wound spirally upon the drum until the material approaching the drum contacts with a flange, whereupon the winding will automatically reverse in direction so as to position spirally the composite strip toward the other flange, whereby an evenly wound spool of material will result. As soon as one spool is wound, the material may be cut off and an empty spool substituted.

By the above process, which may obviously be carried out by other mechanisms than that disclosed or less efficiently by manual operation, there is produced a suitable composite strip in which an excess of metallic foil is present, as indicated in Fig. 2, whereby the same may be readily flexed in order to be braided, wound or pressed into suitable packing members.

What I claim and desire to protect by Letters Patent is:

1. The method of making packing material including assembling a strip of metallic foil and a flexible cord, feeding upon the foil solid lubricating material, and twisting the metallic foil about the cord and lubricating material.

2. The method of making packing material including assembling a strip of metallic foil and a flexible cord, feeding upon the foil solid lubricating material, twisting the metallic foil about the cord and lubricating material, and pressing the foil about the cord.

3. A device for making packing material including means for guiding a strip of metallic foil, means for assembling a flexible cord with the said strip of foil, means operated by the movement of the cord for feeding lubricating material upon the foil, and means for twisting the foil about the cord and lubricating material.

4. A device for making packing material including means for guiding a strip of metallic foil, means for assembling a flexible cord with the said strip of foil, means for feeding lubricant to the foil, means for twisting the foil about the cord, said last named means including a rotatable frame, a spool mounted on the frame to rotate about an axis transverse to the axis of rotation of the frame, and means for rotating the spool about its axis during its rotation with the frame.

5. A device for making packing material including means for guiding a strip of metallic foil, means for assembling a flexible cord with the said strip of foil, means for feeding lubricant to the foil, means for twisting the foil about the cord, said last named means including a rotatable frame, a spool mounted on the frame to rotate about an axis transverse to the axis of rotation of the frame, and means for yieldingly rotating the spool about its axis during its rotation with the frame.

6. A device for making packing material including means for guiding a strip of metallic foil, means for assembling a flexible cord with the said strip of foil, means for twisting the foil about the cord, said last named means including a rotatable frame, a spool mounted on the frame to rotate about an axis transverse to the axis of rotation of the frame, and means for rotating the spool about its axis during its rotation with the frame, the axis of rotation of the frame sloping relatively to the direction of extent of the twisted strip of packing material approaching the spool.

7. A device for making packing material including means for guiding a strip of metallic foil, means for assembling a flexible cord with the said strip of foil, means operated by the movement of the cord for feeding lubricating material upon the foil, means for twisting the foil about the cord and lubricating material, and means for yieldingly taking up the twisted product.

8. The method of making packing material including longitudinally progressing a strip of metallic foil, twisting the strip at one point about an axis approximately aligned with its direction of progression, the strip being substantially flat and held against rotation at a point in advance of the point of twisting whereby a progressive twist is imparted to the strip, and compacting the foil by inwardly directed pressure between the two said points and during the progressive twisting.

9. The method of making packing material including longitudinally progressing a strip of metallic foil, twisting the strip at one point about an axis approximately aligned with its direction of progression, the strip being substantially flat and held against rotation at a point in advance of the point of twisting whereby a progressive twist is imparted to the strip, compacting the foil by inwardly directed pressure between the two said points and during the progressive twisting, and applying lubricant to the strip in advance of the compacting operation.

10. A device for making packing material including means for reeling and twisting a strip of metallic foil, means for guiding the strip in substantially flat condition towards the reeling and twisting means, and a tapered die through which the strip passes between the aforementioned means arranged to compact the foil by inwardly directed pressure, said guiding means maintaining the strips flat at a point substantially in the line of the axis of the die.

11. A device for making packing material including means for reeling and twisting a strip of metallic foil, means for guiding the strip in substantially flat condition towards the reeling and twisting means, a tapered die through which the strip passes between the aforementioned means arranged to compact the foil by inwardly directed pressure, and means for applying lubricant to the strip in advance of the compacting operation.

12. A device for making packing material including means for reeling and twisting a strip of metallic foil, means for guiding the strip in substantially flat condition towards the reeling and twisting means, and means for applying solid lubricant to the strip while it is in substantially flat condition, whereby the lubricant is enclosed in the strip during the twisting operation.

In testimony of which invention, I have hereunto set my hand, at New York, on this 22nd day of June, 1929.

JULIAN N. WALTON.